(12) United States Patent
Knight (10) Patent No.: US 7,395,936 B2
(45) Date of Patent: Jul. 8, 2008

(54) FILTER ELEMENT WITH VENT ORIFICE AND ASSEMBLY THEREFORE

(75) Inventor: Steven R. Knight, Portland, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 236 days.

(21) Appl. No.: 10/669,118

(22) Filed: Sep. 23, 2003

(65) Prior Publication Data

US 2004/0164017 A1    Aug. 26, 2004

Related U.S. Application Data

(60) Provisional application No. 60/479,032, filed on Jun. 17, 2003, provisional application No. 60/450,393, filed on Feb. 26, 2003.

(51) Int. Cl.
B01D 35/00 (2006.01)
B01D 35/28 (2006.01)

(52) U.S. Cl. .................. 210/436; 210/232; 210/472; 210/443; 210/450

(58) Field of Classification Search .............. 210/493.2, 210/263, 497.01, 294, 252.2, 295, 232, 238, 210/440, 443, 444, 472, 236; 55/503, 504
See application file for complete search history.

(56) References Cited

U.S. PATENT DOCUMENTS

| | | | |
|---|---|---|---|
| 2,955,712 A * | 10/1960 | Janusz | ........................ 210/234 |
| 2,997,180 A | 8/1961 | Loveday | |
| 4,217,870 A | 8/1980 | Schleiermacher | |
| 4,617,118 A | 10/1986 | Smart | |
| 4,654,142 A | 3/1987 | Thomsen et al. | |
| 4,764,275 A | 8/1988 | Robichaud | |
| 4,851,118 A | 7/1989 | Kurihara | |
| 4,871,455 A | 10/1989 | Terhune et al. | |
| 5,035,797 A | 7/1991 | Janik | |
| 5,186,152 A | 2/1993 | Cortochiato et al. | |
| 5,186,829 A | 2/1993 | Janik | |
| 5,538,626 A | 7/1996 | Baumann | |
| 5,560,824 A | 10/1996 | Sann et al. | |
| 5,593,577 A | 1/1997 | Imai et al. | |
| 5,803,024 A * | 9/1998 | Brown | ...................... 123/41.15 |
| 5,951,862 A * | 9/1999 | Bradford | ..................... 210/305 |
| 6,139,738 A * | 10/2000 | Maxwell | ..................... 210/248 |
| 6,189,513 B1 | 2/2001 | Brown et al. | |
| 6,270,659 B1 | 8/2001 | Bagci et al. | |
| 6,572,768 B1 * | 6/2003 | Cline et al. | .................. 210/248 |
| 7,014,766 B2 * | 3/2006 | Mack et al. | ............... 210/416.4 |

FOREIGN PATENT DOCUMENTS

WO    WO 01/21278    3/2001

* cited by examiner

*Primary Examiner*—Krishnan S. Menon
*Assistant Examiner*—Benjamin M Kurtz
(74) *Attorney, Agent, or Firm*—Christopher H. Hunter (57) ABSTRACT

A filter element and assembly for fluid applications which require a purging of air, and particularly for applications where the filter element is horizontally oriented (side loaded), where the filter element is rotationally positioned relative to the housing such that a vent orifice is properly located for venting air from the filter element as the element fills with fluid. The housing includes a cylindrical body with a closed end a threaded open end, and a threaded, cup-shaped cover which is screwed down onto the housing. The filter element and housing include i) cooperating retaining devices which temporarily couple the filter element to the housing cover when the element is initially inserted into the housing and the cover is initially screwed onto the housing; and ii) cooperating orientation devices which rotationally orient the filter element in the housing as the housing cover is further and fully screwed down onto the housing.

26 Claims, 6 Drawing Sheets

FILTER ELEMENT WITH VENT ORIFICE AND ASSEMBLY THEREFORE

CROSS-REFERENCE TO RELATED CASES

The present application claims the benefit of the filing date of U.S. Provisional Application Ser. No. 60/450,393, filed Feb. 26, 2003; and U.S. Provisional Application Ser. No. 60/479,032, filed Jun. 17, 2003, the disclosures of which are expressly incorporated herein by reference

FIELD OF THE INVENTION

The present invention relates generally to fluid filters and filter assemblies, and more particularly to a fuel filter and assembly for a vehicle fuel system.

BACKGROUND OF THE INVENTION

In certain fuel systems, such as for vehicles, a pump is provided to move fuel through the system such as from the tank to the engine. A filter element is typically provided upstream (on the vacuum side) of the pump to protect the working components of the pump, as well to protect other downstream components. When the pump is initially primed, air in the filter housing is purged to the extent of the fuel flow through the filter element. When the element is fresh, and only a small portion of the media is being used, this can amount to only a small portion of the air in the housing being purged. As the filter element becomes filled with contaminants over time, the resistance increases and the housing will be purged of a little more air until the fluid will pass through the media easily again. By the end of the element's life, the housing will be full of fuel, and the air will be substantially purged from the housing.

The constant purging of air in the housing does not significantly effect the particulate and contaminant separating functions of the filter, but it can impact the water-removing properties of the media, as the flow is forced through a relatively small portion of the media at a high rate, rather than being spread over a wide surface area. It is preferable to have a wide surface area used to take full advantage of the water-removing capabilities of the filter media.

One solution, particularly for vertically-oriented filter elements, is to provide a bleed orifice in the upper end cap of the filter element. The orifice allows the air to bleed slowly out of the element as the element is being filled with fluid. By sizing the orifice appropriately, and locating the orifice in the upper end cap, the orifice will essentially only allow air to vent out, and will substantially prevent fluid leakage. Any bypass of unfiltered fuel is fairly insignificant and can be caught by secondary filters downstream. By so doing, the fuel fills substantially the entire housing, and passes slowly across a large surface area of the media for efficient water removal.

While the above solution has received some acceptance with vertically-oriented filter elements, it does not address the issue with horizontally oriented (side-loaded) filter elements. Some applications, such as in fuel delivery systems for vehicle engines, require elements to be "side-loaded" due to the location of engine components. For such applications, the elements are typically coupled to the housing cover for ease of insertion and removal. But in so doing, the elements rotate when the cover is screwed down onto the housing. When the filter rotates, it can be difficult to anticipate and control the final location of the vent orifice, and hence to position the vent orifice such that it allows a maximum amount of air to vent from the element. As should be appreciated, positioning the vent orifice, for example, at the bottom or near the bottom of the element will not allow air to be purged from the element.

Thus, it is believed there is a demand for a filter element and assembly for fluid applications which require a purging of air, and particularly for such applications where the filter element is horizontally oriented (side-loaded), where the filter element is rotationally positioned such that the vent orifice is properly located for bleeding air from the filter element as the element fills with fluid.

SUMMARY OF THE INVENTION

The present invention thereby provides a novel and unique filter element and assembly for fluid applications which require a purging of air, and particularly for such applications where the filter element is horizontally oriented (side loaded), where the filter element is rotationally positioned such that the vent orifice is properly located for venting air from the filter element as the element fills with fluid.

According to the present invention, the housing includes a cylindrical body with a closed end and an open end. A cup-shaped cover can be screwed down onto the open end of the housing. The filter element includes i) retaining means which temporarily couples the filter element to the cover when the element is initially inserted into the housing and the cover is initially screwed onto the housing; and ii) orientation means which rotationally orients the filter element in the housing as the cover is further and fully screwed down onto the housing.

According to a preferred embodiment, the filter element includes a ring of filtration media circumscribing a central axis and defining a central cavity. A first, circular end cap is sealingly bonded to a first end of the media ring, and includes an annular body portion bounding a central opening into the central cavity of the media, and a vent orifice in the annular body into the central cavity at a predetermined circumferential location radially outward from the central opening. An orientation device (rib, ridge, tab, etc.) is fixed to and integral with the side sleeve of the first end cap, and projects radially outward therefrom.

The filter element also includes a second, circular end cap sealingly bonded to a second end of the media ring. A retaining device (ribs, ridges, tabs, etc.) is fixed to and integral with the second end cap and projects outward therefrom, either: i) radially from opposite sides of the second end cap; or ii) axially from the end surface of the second end cap.

The cup-shaped cover is sized so that it closely receives the second end cap of the filter element. A retaining device (sets of radial ribs, tabs, ridges, etc.) is provided on the inside surface of the cover that engages and retains the retaining device on the second end cap to temporarily retain the filter element to the cover, so that the cover and element can be inserted together as a subassembly into the housing, with the element rotating in conjunction with the cover as the cover is screwed down onto the housing.

The housing body is also sized so that it closely receives the filter element, and in particular, the first end cap of the filter element. An orientation device (rib, ridge, tab, etc.) is provided on the inside surface of the housing that engages the orientation device on the first end cap after the cover is screwed down a predetermined amount on the housing. The orientation devices on the housing and first end cap of the filter element properly rotationally orient the filter element relative to the housing such that the vent orifice is at its uppermost (top) position on the second end cap. The retaining devices on the cover and on the second end cap of the filter element are dimensioned and configured so that when the orientation devices interact to rotationally fix the filter element relative to the housing, the cover can rotate relative to the element to fully tighten the cover down onto the housing.

The fluid system can then be operated with the filter element in a position such that the vent orifice allow proper bleeding of air from the element as the element fills with fluid during use.

When a spent element is to be removed from the housing, the above procedure is reversed. That is, the cover is unscrewed and removed from the housing. When the element is pulled out from the housing such that the orientation device on the first end cap is separated from the orientation device on the housing, the element again is temporarily retained on the cover by the interaction of the retaining devices on the second end cap and cover, such that the cover and element can be removed as a subassembly. The element can then be easily removed from the cover and replaced with a fresh element.

As such, the present invention thereby provides a filter element and assembly for fluid applications which require a purging of air, and particularly for such applications where the filter element is horizontally oriented (side-loaded), where the filter element is rotationally positioned such that the vent orifice is properly located for bleeding air from the filter element as the element fills with fluid.

Further features and advantages of the present invention will become apparent to those skilled in the art upon reviewing the following specification and attached drawings.

DETAILED DESCRIPTION OF THE PREFERRED EMBODIMENT

Figure 1:
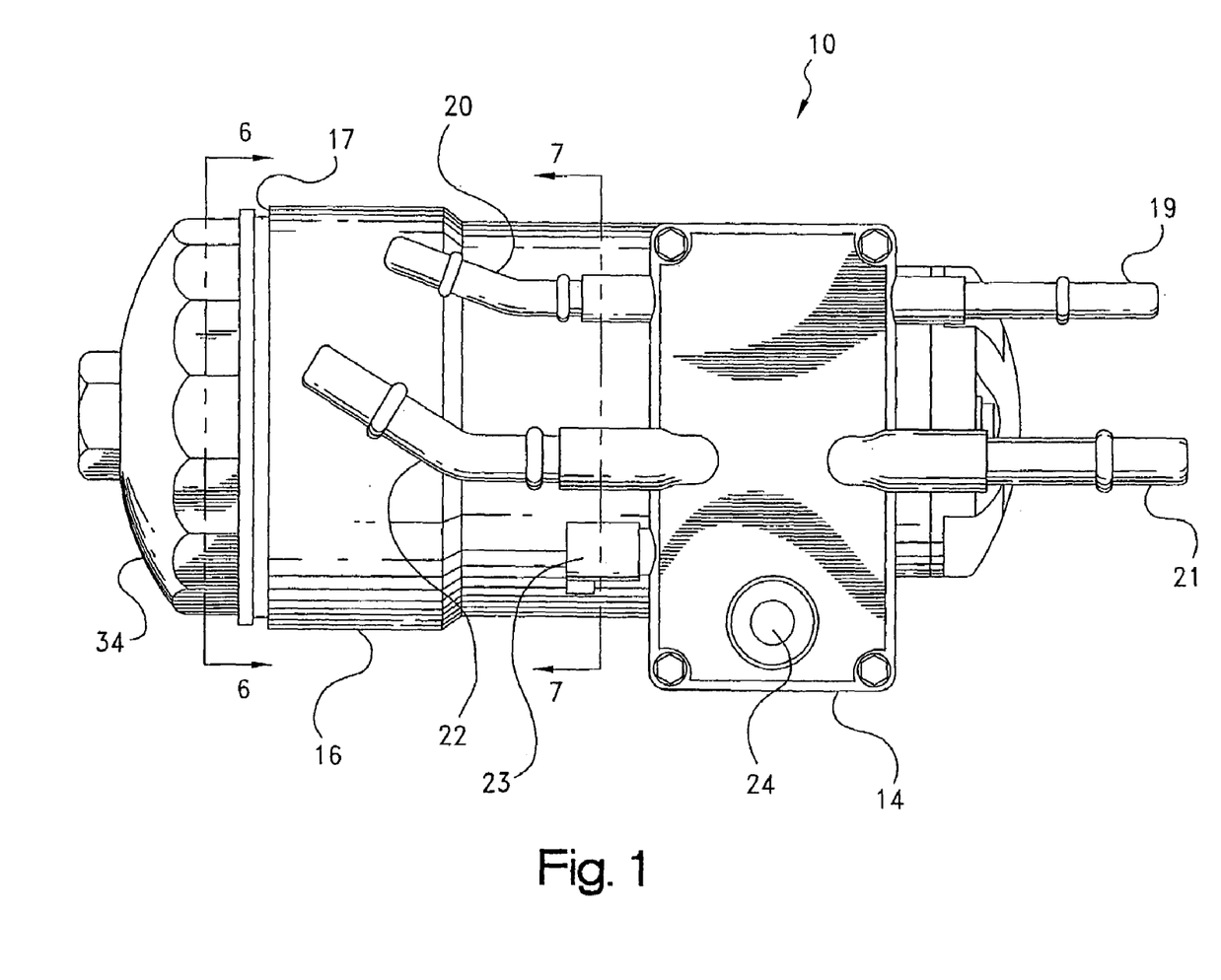
FIG. 1 is a side view of a filter assembly constructed according to the principles of the present invention.

Referring to the drawings, and initially to FIG. 1, a filter assembly constructed according to the principles of the present invention is indicated generally at 10. The filter assembly 10 can be useful for removing particulate and other contaminants from any type of fluid system, and in one application, is particularly useful as a filter assembly for removing particulate and other contaminant from a fuel stream in a fuel system for a vehicle. In such an application, the filter assembly can be located upstream, on the vacuum side of a pump for moving fuel through the system, e.g., from the tank to the engine.

As illustrated in FIG. 1, the filter assembly is horizontally oriented, that is, the filter assembly is designed to be side-loaded, as will be described in more detail below.

The filter assembly 10 includes a filter module 14, including a cylindrical housing or canister 16, projecting outwardly from one side of the module from a closed end to a distal, open end 17. A first fuel inlet 19 is provided to direct fuel to be filtered (from the tank) into the module; while a second fluid outlet 20 is provided to direct filtered fuel from the module (e.g., to the pump and then to the engine). Other fuel inlets and outlets 21, 22, direct fuel returning from the engine through a pressure control feature of the module (not shown) and then back to tank. Appropriate pressure control features are shown for example, in U.S. Pat. Nos. 6,189,513, and 6,555,000, which are incorporated herein by reference. The housing is preferably formed from metal or other appropriate material using conventional processes (e.g., die-casting, machining, etc.). Electrical connections as at 23 for remote operation of heaters, water sensors and pressure sensors can be provided in the module, if necessary or desirable. A water drain as at 24 can be provided on the lower side of the module. Appropriate brackets and other attachment structure can be provided as necessary on the module to enable the module to be fixed to an appropriate location in the engine compartment or other support structure.

Figure 2:
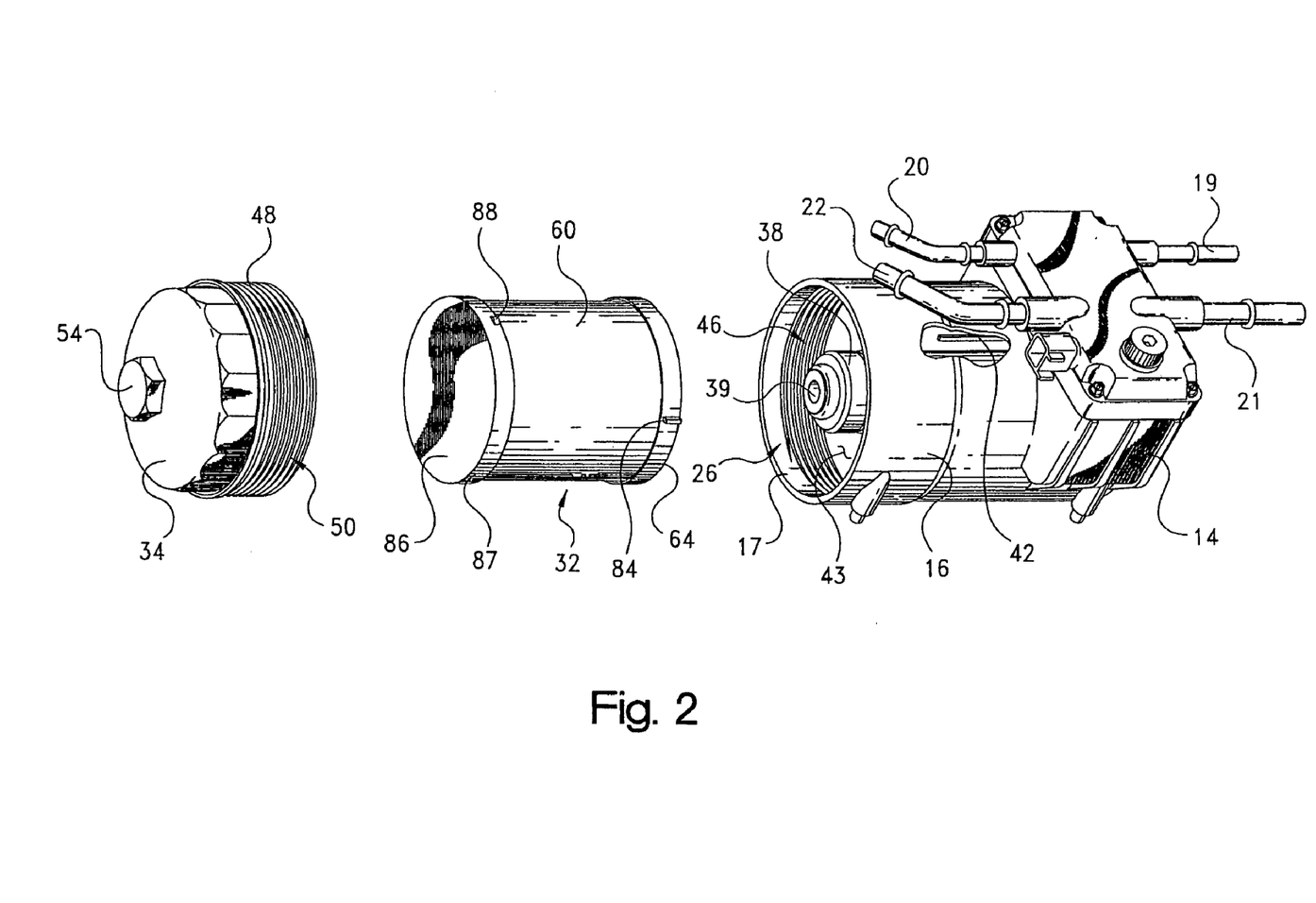
FIG. 2 is an exploded view of the filter assembly of FIG. 1.
Figure 3:
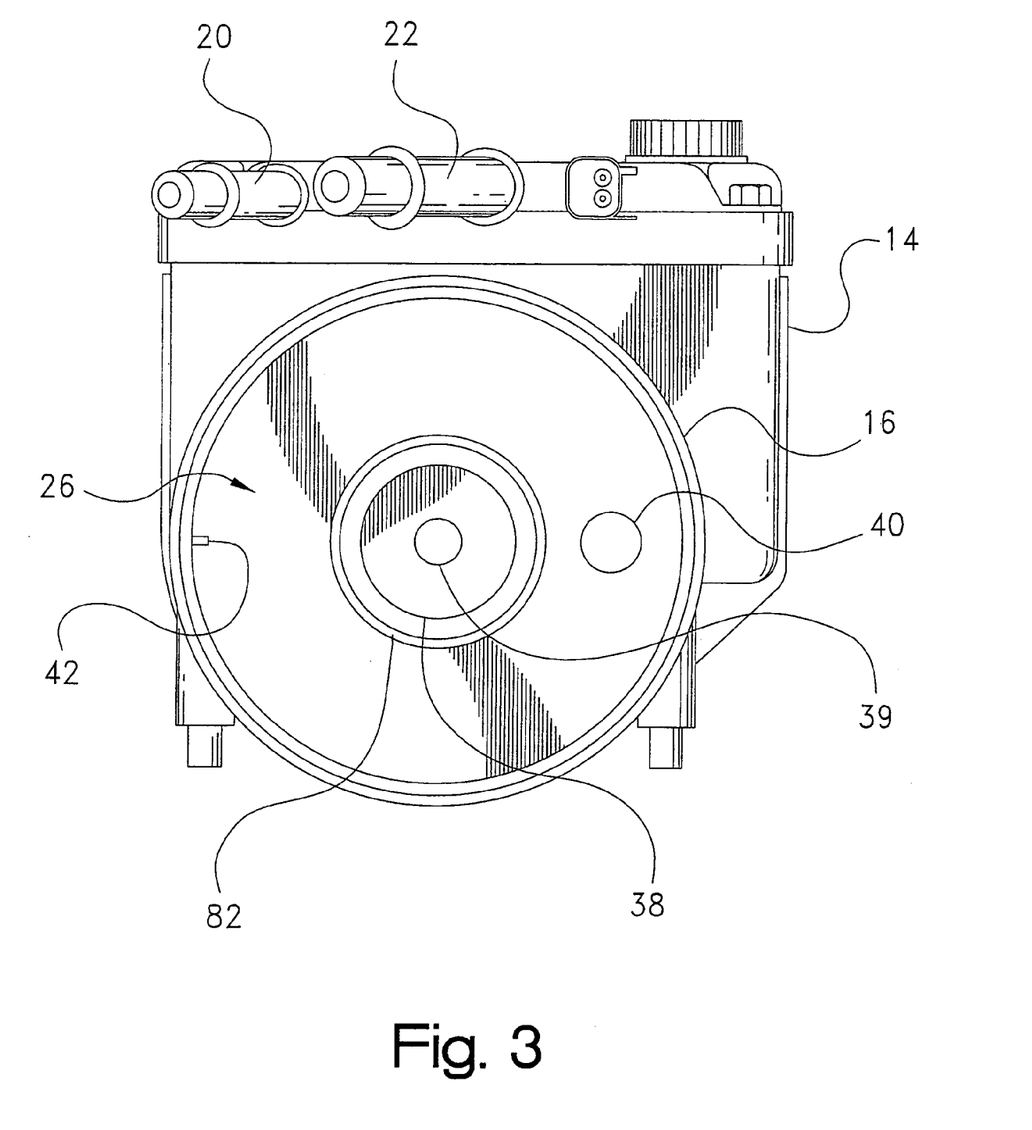
FIG. 3 is an end view of the housing for the filter assembly.

Referring now also to FIGS. 2 and 3, the housing 16 includes an internal chamber, indicated generally at 26, which receives a filter element, indicated generally at 32. A cover 34 encloses the open end of the housing. A cylindrical collar or tube 38 is provided internally of the housing, extending a short distance from the closed end to the open end, with a central opening 39 fluidly connected to the outlet 20 for directing filtered fluid from the filter element to the outlet. An opening 40 into the area between the collar and the housing is also provided in fluid communication with the inlet 19 to direct fluid to be filtered into the housing. The filter assembly is described above as providing a flow radially inward through the element, however it should be appreciated that the inlets and outlets to the module could be reversed, and the element could provide a radially-out flow, if necessary or desirable for the particular application.

An orientation device 42 is provided along the internal surface 43 of the housing 16. The device 42 preferably comprises a rib, tab, ridge or other radially inward projecting geometry fixed to the housing and extending axially a predetermined distance from the closed end of the housing toward the open end. The orientation device 42 is preferably formed unitary (in one piece) with the housing, but it could also be formed as a separate piece and then attached to the interior surface in an appropriate manner. The reasons for the device 42 will be described in more detail below.

As can also be seen in FIG. 2, the housing has a threaded portion, indicated generally at 46, extending inwardly a short distance along the inner surface of the housing from the open end 17.

Figure 4:
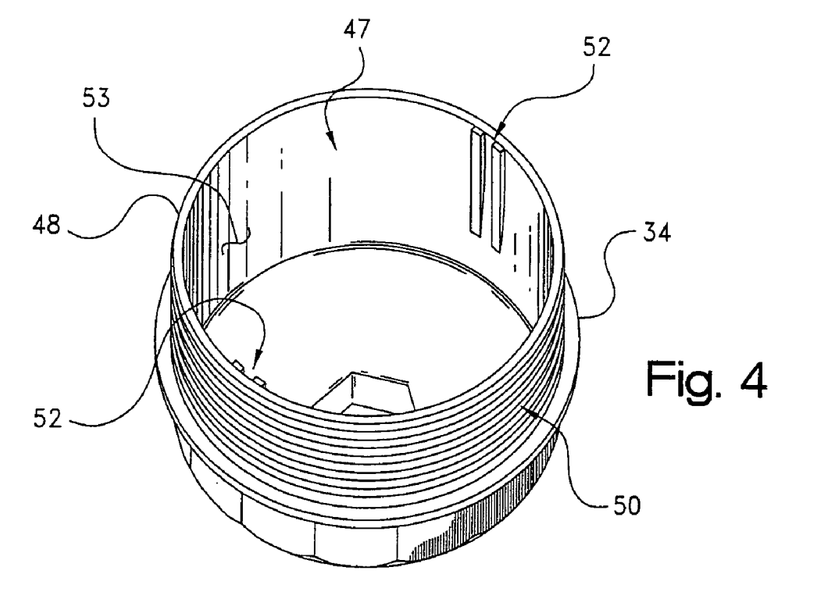
FIG. 4 is an elevated perspective view of the cover for the filter assembly.

Referring now to FIGS. 2 and 4, the cover 34 for the filter assembly has a cup-shaped configuration defining an internal cavity, indicated generally at 47. The cover includes an annular sleeve 48 having an external threaded portion, indicated generally at 50, which sleeve and threads are dimensioned to enable the cover to be received in the open end of the housing, with the threads on the sleeve cooperating with the threads on the housing to enable the cover to be screwed onto and off of the filter housing 16. The cover is preferably formed in one piece from appropriate material (e.g., plastic) using convention processes (e.g., molding).

A retaining device, indicated generally at 52, is provided in the internal cavity 47 of the cover, and preferably along the interior surface 53 of sleeve 48. The retaining device 52 preferably comprises two (or more) pairs of closely spacedapart ribs, tabs, ridges or other radially inward projecting elements fixed to and extending axially along the length of the sleeve. The retaining device 52 is preferably formed unitary (in one piece) with the sleeve, but it (or they) could also be formed as separate pieces and then attached to the interior surface of the cover in an appropriate manner. The reasons for the retaining device 52 will be described in more detail below Appropriate external geometry as at 54, can be provided on the cover for engagement by a tool to facilitate screwing the cover onto and off of the housing.

Figure 5:
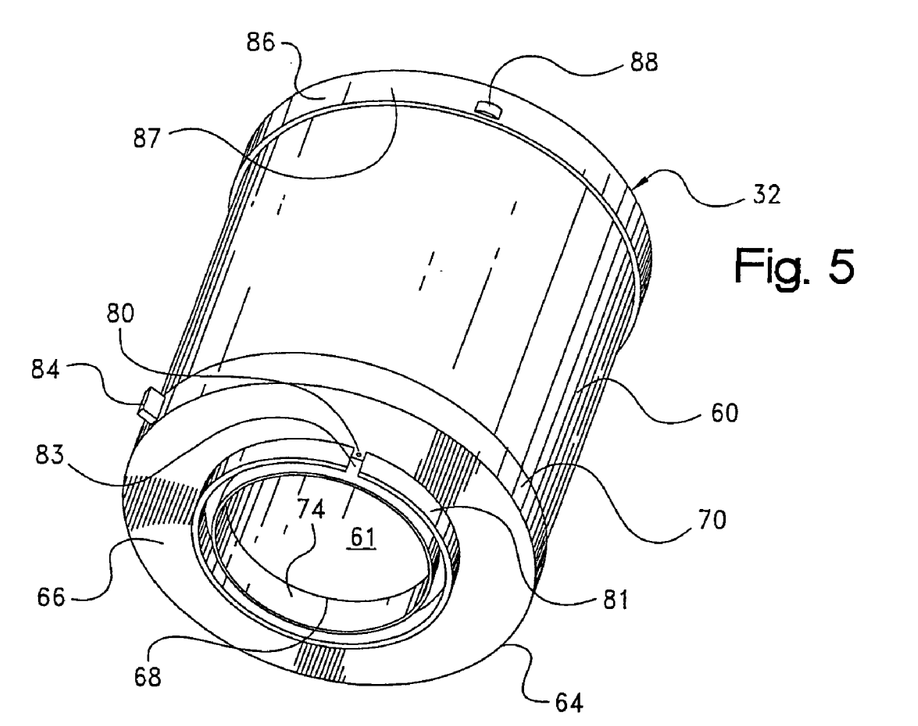
FIG. 5 is an elevated perspective view of the filter element for the filter assembly.

Referring now to FIGS. 2 and 5, the filter element 32 includes a ring of filtration media 60 circumscribing a central axis and defining a central cavity 61. The filtration media ring has a first end and a second end, and is formed from a material having an efficiency and structure (pleated, blown, etc.) appropriate for the particular application.

A first, circular end cap 64 is sealingly bonded to the first end of the media ring, and includes an annular body portion 66 defining a central opening 68 into the cavity 61 of the media. A short sleeve 70 extends axially from the periphery of the body portion 66 towards the opposite end of the element, and outwardly bounds the media 60. A flexible lip seal 74 bounds the central opening 68 in the first end cap and projects axially outward from the end surface of the first end cap and tapers slightly radially inward into the central opening. Opening 68 is dimensioned to receive the collar 38 of the housing, with the seal 74 providing a fluid seal therewith. While seal 74 is shown as a unitary piece with end cap 64, it is possible the seal could be a separate piece, such as an elastomeric O-ring seal, and be carried in an inwardly-facing groove of the end cap.

Figure 7:
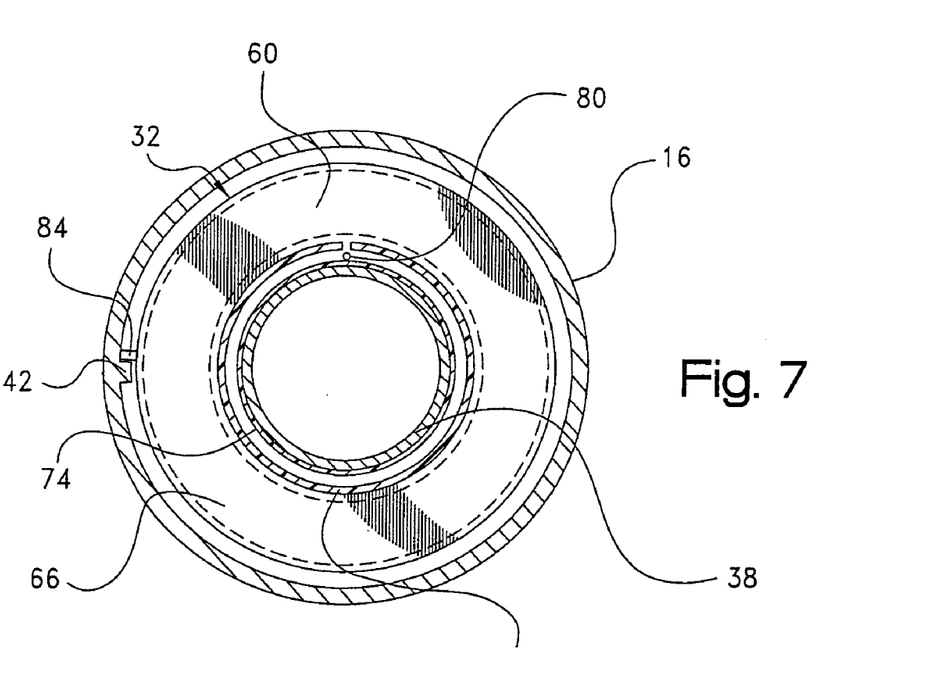
FIG. 7 is a cross-sectional end view of the filter assembly, taken substantially along the plane described by the lines 7-7 in FIG. 1.

The annular body portion 66 of the first end cap projects radially inward a greater extent than the inner dimension of the media ring. A vent orifice 80 is provided in the body portion 66 of the first end cap, radially outwardly spaced from the central opening 68, and radially inwardly spaced from the inner dimension of the media ring 60 (see, e.g., FIG. 7). An annular sleeve 81 outwardly bounds the orifice 80 and is radially outwardly spaced from lip seal 74. Annular sleeve 81 fits partially into an annular channel 82 (FIG. 3) internal to the housing to locate and support the element in the housing. Sleeve 81 also protects the vent orifice 80 in that it prevents unintentional obstruction of orifice 80 by the housing. A notch or gap 83 is provided around sleeve 81 to control and meter the flow through the orifice. Notch 83 is preferably radially aligned with vent orifice 80.

An orientation device 84 is fixed to and integral with the first end cap and projects radially outward therefrom. Preferably the orientation device on the end cap comprises a rib, tab, ridge or other radially outward projecting element fixed to the outer sleeve 70 of the end cap. The orientation device 84 is preferably formed unitary (in one piece) with the first end cap, but it could also be formed as a separate piece and then attached to the end cap in an appropriate manner. The reasons for the device 82 will also be described in more detail below, although it is noted that there is a predetermined correlation between the location of the orientation device 84 relative to the vent orifice 80 in the first end cap.

The filter element also includes a second, circular end cap 86 sealingly bonded to the second end of the media ring. A short sleeve 87 extends axially from the periphery of the end cap toward the opposite end of the element, and outwardly bounds the media 60. According to a first embodiment, one, and preferably two retaining devices as at 88 are fixed to and integral with the second end cap and project radially outward therefrom, from opposite sides of the second end cap. Preferably the retaining devices on the second end cap each comprise a rib, tab, ridge or other radially outward projecting element fixed to the end cap. The retaining devices 88 are preferably formed unitary (in one piece) with the second end cap, but they could also be formed as separate pieces and then attached to the end cap in an appropriate manner. The reasons for the retaining devices 88 will also be described in more detail below.

End caps 64, 86 are formed of appropriate impervious material for the particular application, such as plastic, using conventional techniques, such as molding. Appropriate adhesive or potting material is provided between media 60 and the inner surface of end caps 64, 86.

Figure 6:
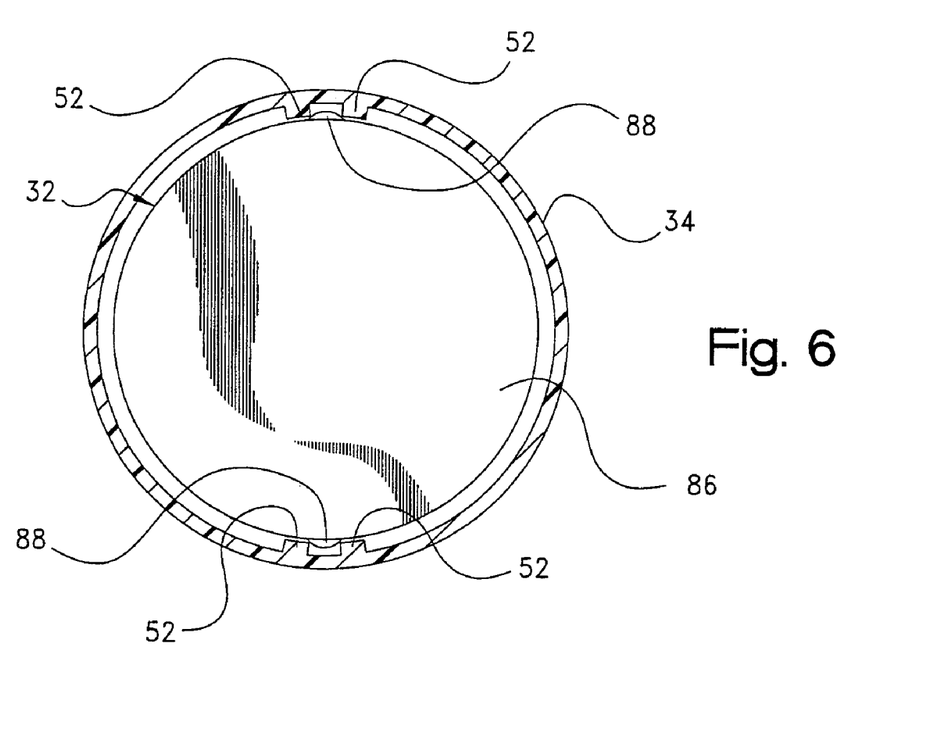
FIG. 6 is a cross-sectional end view of the filter assembly, taken substantially along the plane described by the lines 6-6 of FIG. 1.

The cup-shaped cover 34 for the filter element is sized so that it closely receives the second end cap 86 of the filter element. When it is desired to assemble the filter assembly, the second end cap 86 of the filter element is inserted into ("snapped into") the internal cavity 47 of cover 34, and the retaining devices 88 on the second end cap cooperate with the retaining devices 52 on the cover to temporarily couple the filter element to the cover. As show in FIG. 6, each rib 88 on the second end cap is received between a pair of the closely spaced ribs 52 on the cover. The cover 54 and element 32 can then be inserted together as a subassembly into the open end of the housing 16, with the collar 38 of the housing being received and sealed within the central opening 68 in the first end cap of the filter element.

The first end cap 64 is likewise sized so that it is closely received in the housing 16. As the cover is first screwed down onto the open end of the housing, the element remains coupled to the cover, and rotates therewith. The orientation devices 42, 84 on the housing and first end cap, respectively, are axially separated and do not engage. After a predetermined threading of the cover on the housing so as to draw the element axially further into the housing (preferably after the cover is screwed down about half-way), the orientation devices 42, 84 become axially aligned and engage (see FIG. 7). In so doing, the orientation devices cause the element to be rotationally fixed relative to the housing. The circumferential location of the orifice vent 80 is chosen such that when the orientation devices interengage, the orifice is near, and preferably at the top or uppermost portion of the first end cap 61. As should be appreciated, the location of the orientation devices 42, 84 can be at any circumferential location around the end cap—as long as when they interengage to rotationally lock the element with respect to the housing, the vent orifice 80 is located at or near the top of the element.

The retaining devices on the cover 34 and on the second end cap 86 of the filter element are configured and dimensioned such that when the orientation devices 42, 84 interact to rotationally couple the filter element to the filter housing, the retaining devices can then release and pass over each other with little effort, and the cover can then be rotated relative to the element to fully tighten the cover down onto the housing, while the element remains rotationally fixed and is only drawn further axially into the housing.

The fluid system can then be operated with the filter element in a position such that the vent orifice 80 allow proper bleeding of air from the element cavity 61 as the element collects fluid during use.

When a spent element is to be removed from the housing, the above procedure is reversed. That is, the cover 34 is unscrewed and removed from the housing 16. When the element 32 is pulled out from the housing such that the orientation rib 84 on the first end cap is separated from the orientation rib 42 on the housing, the element again is temporarily retained on the cover by the interaction of the retaining ribs on the second end cap and the cover (and rotates therewith), such that the cover and element can be removed as a subassembly from the housing. The element can then be simply removed from the cover by pulling the element away from the cover.

Figure 8:
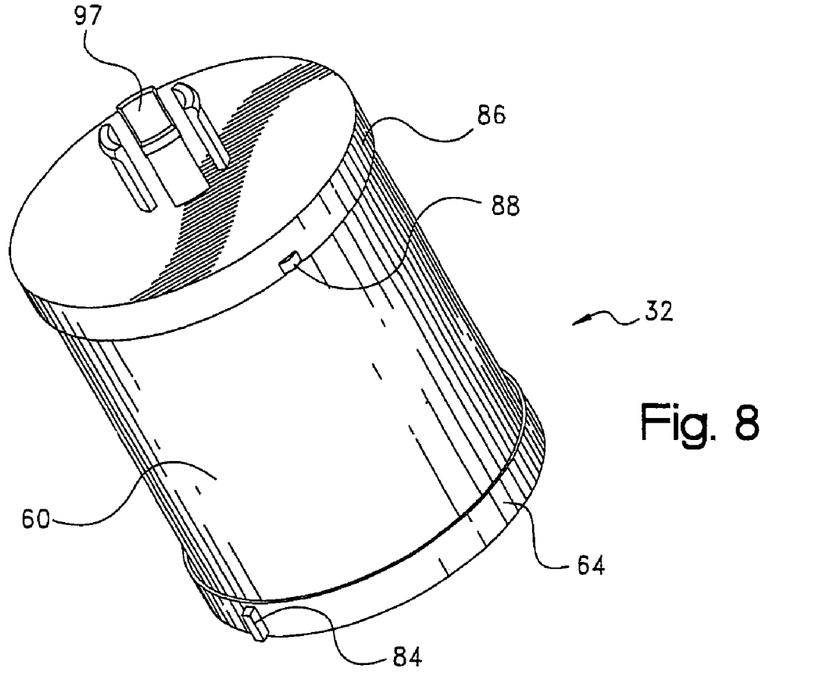
FIG. 8 is an elevated perspective view of the filter element for the filter assembly, constructed according to a second embodiment of the present invention.
Figure 9:
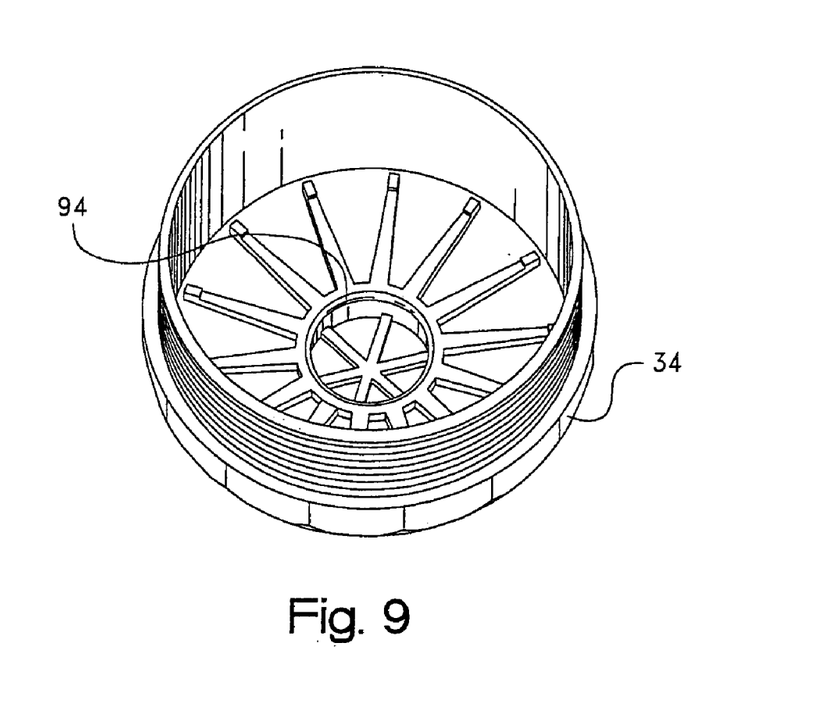
FIG. 9 is an elevated perspective view of a cover for the filter element of FIG. 8.

According to a second embodiment shown in FIGS. 8 and 9, the second end cap 86 of the filter element can include a series of axially-extending flexible fingers, tabs or other elements 92 which interengage with a lip 94 on the inside of cover 34 to retain the element to the cover during initial assembly. The number, length and spacing of fingers 92 can vary depending upon the particular application, as should be appreciated. The interaction between the fingers 92 and lip 94 is such that when the cover is initially screwed onto housing 16 a pre-determined amount (preferably half-way) such that orientation devices 42, 84 interengage as described above, and the element becomes rotationally fixed relative to the housing, the cover 34 can then turn relative to the element, as the cover is fully tightened down onto the housing. As before, when the element is spent and needs to be replaced, and the cover is screwed off the housing in the same manner as described above, the element can be easily removed from the cover simply by pulling the element outwardly away from the cover.

It should be appreciated that while cooperating sets of retaining devices are shown and described in the embodiments above, for temporarily coupling the filter element to the cover, the cover and element could be sized so that merely an interference fit occurs between the sleeve 48 on the cover, and the second end cap 86 of the element. Or one of the cover and second end cap could have some geometric deformity (such as a rib, ridge, tab, etc.), while the other of the cover and second end cap would not, which would also create an interference fit and temporarily couple the element to the cover if properly dimensioned. In each of these cases, the end cap structure and cover structure could be dimensioned to achieve the same result—temporarily coupling the element to the end cap such that the subassembly can be inserted into the housing and the cover at least partially tightened down, and then the cover "releasing" the element such that the cover can be fully tightened while the element remains rotationally fixed via the cooperating orientation devices on the first end cap and housing.

Moreover, while the orientation devices are shown as being on the periphery of the first end cap and on the interior surface of the housing, it is possible that the orientation devices could alternatively be on the inner annulus of the first end cap and on the collar 38, and still achieve substantially the same result.

As described above, the present invention thereby provides a filter element and assembly for fluid applications which require a purging of air, and particularly for such applications where the filter element is horizontally oriented (side loaded), where the filter element is rotationally positioned such that the vent orifice is properly located for venting air from the filter element as the element fills with fluid.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter element, comprising:
   a ring of filtration media circumscribing a central axis and defining a central cavity, the filtration media ring having a first end and a second end;
   a first, circular end cap having an inner surface sealingly bonded to the first end of the media ring, the first end cap including an annular body portion defining a central opening into the central cavity of the media, a sealing device bounding the central opening, a vent orifice in the annular body into the central cavity at a predetermined location, radially outward from the sealing device, and an orientation device permanently fixed to and integral with the first end cap and projecting radially outward therefrom; and
   a second, circular end cap sealingly bonded to the second end of the media ring, a retaining device fixed to and integral with the second end cap and projecting outwardly therefrom.

2. The filter element as in claim 1, wherein the sealing device comprises a flexible lip seal bounding the central opening of the first end cap.

3. The filter element as in claim 2, wherein the flexible lip seal is unitary with the first end cap.

4. The filter element as in claim 1, wherein the retaining device is unitary with the second end cap.

5. The filter element as in claim 1, wherein the first end cap includes a sleeve outwardly bounding the peripheral edge of the first end cap, and extending a short distance from the first end cap toward the second end cap, the orientation device being unitary with the sleeve of the first end cap and projecting radially outward therefrom.

6. The filter element as in claim 1, wherein the orientation device is unitary with the first end cap.

7. The filter element as in claim 1, wherein the retaining device comprises a plurality of individual elements, fixed to and integral with the second end cap and projecting radially outward therefrom.

8. The filter element as in claim 1, wherein the retaining device projects radially outward from the second end cap.

9. The filter element as in claim 1, wherein the second end cap includes a sleeve outwardly bounding the peripheral edge of the second end cap, and extending a short distance from the second end cap toward the first end cap, the retaining device being unitary with the sleeve of the second end cap and projecting radially outward therefrom.

10. The filter element as in claim 1, wherein the vent orifice is disposed radially intermediate the sealing device and the media ring.

11. The filter element as in claim 1, further including an annular locating sleeve projecting outwardly from the annular body portion, radially outwardly spaced from the sealing device.

12. The filter element as in claim 11, wherein the locating sleeve is radially outwardly disposed from the vent orifice, and includes a notch located in radial alignment with the vent orifice.

13. The filter element as in claim 11, wherein the locating sleeve is discontinuous, and includes a notch.

14. A filter assembly comprising a housing having a threaded open end, a closed end, and a central axis, a first port to direct fluid into the housing and a second port to direct fluid from the housing, the housing including orientation means integral with an internal surface of the housing and projecting outwardly therefrom; a cup-shaped cover with threads adapted to be screwed down onto the threaded open end of the housing, the cover including retaining means internally of the cover; and a filter element removably disposed within the housing, the filter element including a ring of filtration media circumscribing a central axis and defining a central cavity, the filtration media ring having a first end and a second end; a first, circular end cap at the first end of the media ring, and an annular body portion defining a central opening for receiving a cylindrical component, and an annular seal bounding the central opening of the first end cap for providing a fluid seal with the cylindrical component, a vent orifice in the first end cap into the central cavity of the filter element, disposed radially outward from the seal, and a cooperating orientation means permanently fixed to and integral with the first end cap and projecting outwardly therefrom, the orientation means of the first end cap having a configuration such that the orientation means on the first end cap cooperates with the orientation means in the housing when the element is fully received therein to rotationally orient the filter element with respect to the housing such that the orifice in the first end cap is in a predetermined rotational position relative to the housing; and a second, circular end cap at the second end of the media ring, the second end cap including retaining means, the retaining means of the second end cap interengaging with the retaining means of the cover to temporarily couple the end cap to the cover when the cover is initially screwed down onto the housing, wherein when the cover is initially screwed down onto the housing, the filter element rotates in conjunction with the cover until the cover is screwed down a predetermined amount, after which the orientation means of the first end cap engages the orientation means of the housing, to rotationally lock the filter element with respect to the housing, the interengagement between the cover and element being such that when the orientation means of the housing and first end cap engage, the cover can thereafter rotate with respect to the filter element as the cover is fully screwed down onto the housing, and when the cover is removed to replace a spent element, the orientation means remaining with the element as the element is removed from the housing.

15. The filter assembly as in claim 14, further including an annular locating sleeve projecting outwardly from the annular body portion, disposed radially outward from the central opening, and the vent orifice is disposed radially between the seal and the locating sleeve, and the housing includes a corresponding annular channel located so as to receive the locating sleeve when the filter element is located in the housing, so as to locate and support the element in the housing.

16. The filter assembly as in claim 15, wherein the locating sleeve is discontinuous, and includes a notch.

17. The filter assembly as in claim 15, wherein the locating sleeve includes a notch located in radial alignment with the vent orifice.

18. A filter assembly comprising a housing having a threaded open end, a closed end, and a central axis, a first port to direct fluid into the housing and a second port to direct fluid from the housing, the housing including an orientation device integral with an internal surface of the housing and projecting radially inward therefrom; a cup-shaped cover with threads adapted to be screwed down onto the threaded open end of the housing, the cover including a retaining device internally of the cover and projecting radially outwardly therefrom; and a filter element removably disposed within the housing, the filter element including a ring of filtration media circumscribing a central axis and defining a central cavity, the filtration media ring having a first end and a second end; a first, circular end cap at the first end of the media ring, having an annular body portion defining a central opening for receiving a cylindrical component, and an annular seal bounding the central opening of the first end cap for providing a fluid seal with the cylindrical component, a vent orifice in the first end cap into the central cavity of the filter element, disposed radially outward from the seal, and a cooperating orientation device permanently fixed to and integral with the first end cap and projecting radially outwardly therefrom, the orientation device of the first end cap having a configuration such that the orientation device on the first end cap cooperates with the orientation device in the housing when the element is fully received therein to rotationally orient the filter element with respect to the housing such that the orifice in the first end cap is in a predetermined rotational position relative to the housing; and a second, circular end cap at the second end of the media ring, a retaining device integral with the second end cap and projecting outwardly therefrom, the retaining device of the second end cap having a configuration such that the retaining device of the second end cap interengages with the retaining device on the cover to temporarily couple the end cap to the cover when the cover is initially screwed down onto the housing, wherein when the cover is initially screwed down onto the housing, the filter element rotates in conjunction with the cover until the cover is screwed down a predetermined amount, after which the orientation device on the first end cap engages the orientation device on the housing, to rotationally lock the filter element with respect to the housing, the interengagement between the cover and element being such that when the orientation device on the housing and first end cap engage, the cover can thereafter rotate with respect to the filter element as the cover is fully screwed down onto the housing.

19. The filter assembly as in claim 18, wherein the retaining device on the second end cap comprises a rib, ridge or tab, and the retaining device on the cover comprises a pair of closely-spaced ribs, ridges or tabs for each retaining device on the second end cap.

20. The filter assembly as in claim 18, wherein the orientation device on the first end cap comprises a rib, ridge or tab and the orientation device on the housing comprises a rib, ridge or tab.

21. The filter assembly as in claim 18, further including an annular locating sleeve projecting outwardly from the annular body portion, disposed radially outward from the central opening, and the vent orifice is disposed radially between the seal and the locating sleeve, and the housing includes a corresponding annular channel located so as to receive the locating sleeve when the filter element is located in the housing, so as to locate and support the element in the housing.

22. The filter assembly as in claim 21, wherein the locating sleeve includes a notch located in radial alignment with the vent orifice.

23. The filter assembly as in claim 21, wherein the locating sleeve is discontinuous, and includes a notch.

24. A filter element, comprising:
a ring of filtration media circumscribing a central axis and defining a central cavity, the filtration media ring having a first end and a second end;
a first, circular end cap having an inner surface sealingly bonded to the first end of the media ring, the first end cap including an annular body portion defining a central opening into the central cavity of the media, sealing means bounding the central opening for sealing against a circular collar, an annular locating sleeve radially outwardly spaced from the central opening and projecting outwardly from the annular body portion, a vent orifice in the annular body into the central cavity at a predetermined circumferential location, radially disposed between the sealing means and locating sleeve, and orientation means permanently fixed to and integral with the first end cap and projecting radially outward therefrom for rotationally orienting the filter element within a cylindrical housing, the orientation means remaining with the element when the filter element is removed from the housing; and a second, circular end cap sealingly bonded to the second end of the media ring, retaining means fixed to and integral with the second end cap and projecting outwardly therefrom for temporarily retaining the element within a cover.

25. The filter element as in claim 24, wherein the sleeve includes a notch located in radial alignment with the vent orifice.

26. The filter element as in claim 24, wherein the locating sleeve is discontinuous, and includes a notch.

* * * * *